United States Patent
Chen et al.

(10) Patent No.: US 11,947,818 B2
(45) Date of Patent: Apr. 2, 2024

(54) METHOD FOR ACCESSING FLASH MEMORY MODULE AND ASSOCIATED FLASH MEMORY CONTROLLER AND ELECTRONIC DEVICE

(71) Applicant: Silicon Motion, Inc., Hsinchu County (TW)

(72) Inventors: Ching-Ke Chen, Hsinchu County (TW); Wei-Chih Hsu, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 86 days.

(21) Appl. No.: 17/725,531

(22) Filed: Apr. 20, 2022

(65) Prior Publication Data
US 2023/0342052 A1    Oct. 26, 2023

(51) Int. Cl.
*G06F 3/06*    (2006.01)
*G06F 12/02*   (2006.01)
*G06F 12/10*   (2016.01)

(52) U.S. Cl.
CPC ............ *G06F 3/064* (2013.01); *G06F 3/0658* (2013.01); *G06F 3/0659* (2013.01); *G06F 3/0679* (2013.01); *G06F 12/0246* (2013.01); *G06F 12/10* (2013.01); *G06F 3/0604* (2013.01)

(58) Field of Classification Search
None
See application file for complete search history.

(56) References Cited

U.S. PATENT DOCUMENTS

| | | | |
|---|---|---|---|
| 9,563,550 B2 | 2/2017 | Cheng | |
| 2014/0052898 A1* | 2/2014 | Nan | G06F 12/0246 |
| | | | 711/E12.008 |
| 2014/0068158 A1 | 3/2014 | Cheng | |
| 2018/0314643 A1* | 11/2018 | Park | G06F 12/0246 |
| 2019/0188127 A1* | 6/2019 | Lee | G06F 11/1068 |
| 2020/0201774 A1* | 6/2020 | Park | G06F 9/3814 |
| 2020/0409604 A1* | 12/2020 | Tajima | G06F 12/0238 |
| 2021/0026548 A1* | 1/2021 | Kang | G06F 12/0246 |
| 2021/0097004 A1* | 4/2021 | Nagarajan | G11C 16/10 |
| 2022/0004332 A1* | 1/2022 | Kang | G06F 3/0659 |
| 2022/0229772 A1* | 7/2022 | Jin | G06F 12/0246 |

FOREIGN PATENT DOCUMENTS

| | | |
|---|---|---|
| TW | I492051 B | 7/2015 |
| TW | 201901432 A | 1/2019 |

* cited by examiner

*Primary Examiner* — Kaushikkumar M Patel
(74) *Attorney, Agent, or Firm* — Winston Hsu

(57) ABSTRACT

The present invention provides a method for accessing a flash memory module, wherein the method includes the steps of: writing data into a plurality of pages of a specific block, and establishes or updates a F2H mapping table based on physical addresses of the plurality of pages and logical addresses of the data; using the F2H mapping table to update a H2F mapping table; initializing a flush-bitmap, wherein the flush-bitmap records a plurality of flush bits corresponding to the physical addresses of the plurality of pages, respectively; receiving a trim command from a host device, wherein the trim command asks to mark at least one of the logical addresses of the data as invalid; updating the H2F mapping data according to the trim command; updating the flush-bitmap according to the trim command; and writing the updated H2F mapping table and the updated flush-bitmap into the flash memory module.

15 Claims, 14 Drawing Sheets

| Physical address | Flush bit | Corresponding logical address |
|---|---|---|
| P0 | 0 | LBA0 |
| P1 | 0 | LBA1 |
| P2 | 0 | LBA2 |
| P3 | 0 | LBA3 |
| P4 | 0 | LBA4 |
| P5 | 0 | LBA5 |
| P6 | 0 | LBA6 |
| P7 | 0 | LBA7 |
| P8 | 0 | LBA8 |
| P9 | 0 | LBA9 |
| P10 | 0 | LBA10 |
| P11 | 0 | LBA11 |
| P12 | 0 | LBA12 |
| .... | 0 | #### |

FIG. 5

| Flush-bitmap for bank[00] | 610 |
|---|---|
| P0 | 0 |
| P1 | 0 |
| P2 | 0 |
| P3 | 0 |
| P4 | 0 |
| P5 | 0 |
| P6 | 0 |
| P7 | 0 |

| Flush-bitmap for bank[01] | 620 |
|---|---|
| P8 | 0 |
| P9 | 0 |
| P10 | 0 |
| P11 | 0 |
| P12 | 0 |
| P13 | 0 |
| P14 | 0 |
| P15 | 0 |

FIG. 6

| Logical address | Trim/UNC bit | Corresponding physical address |
|---|---|---|
| LBA0 | 0 | B0, P0 |
| LBA1 | 0 | B0, P1 |
| LBA2 | 0 | B0, P2 |
| LBA3 | 0 | B0, P3 |
| LBA4 | 0 | B0, P4 |
| LBA5 | 0 | #### |
| LBA6 | 0 | #### |
| LBA7 | 0 | #### |
| LBA8 | 0 | #### |
| LBA9 | 0 | #### |
| LBA10 | 0 | #### |
| LBA11 | 0 | #### |
| LBA12 | 0 | #### |
| ... | | |

710

Flush

| Physical address | Flush bit | Corresponding logical address |
|---|---|---|
| P0 | 1 | LBA0 |
| P1 | 1 | LBA1 |
| P2 | 1 | LBA2 |
| P3 | 1 | LBA3 |
| P4 | 1 | LBA4 |
| P5 | 0 | LBA5 |
| P6 | 0 | LBA6 |
| P7 | 0 | LBA7 |
| P8 | 0 | LBA8 |
| P9 | 0 | LBA9 |
| P10 | 0 | LBA10 |
| P11 | 0 | LBA11 |
| P12 | 0 | LBA12 |
| ... | | #### |

510

| Flush-bitmap for bank[00] | |
|---|---|
| P0 | 1 |
| P1 | 1 |
| P2 | 1 |
| P3 | 1 |
| P4 | 0 |
| P5 | 0 |
| P6 | 0 |
| P7 | 0 |

610

| Flush-bitmap for bank[01] | |
|---|---|
| P8 | 0 |
| P9 | 0 |
| P10 | 0 |
| P11 | 0 |
| P12 | 0 |
| P13 | 0 |
| P14 | 0 |
| P15 | 0 |

| Logical address | Trim/UNC bit | Corresponding physical address |
|---|---|---|
| LBA0 | 0 | B0, P0 |
| LBA1 | 0 | B0, P1 |
| LBA2 | 1 | B0, P2 |
| LBA3 | 0 | B0, P3 |
| LBA4 | 1 | B0, P4 |
| LBA5 | 1 | #### |
| LBA6 | 0 | #### |
| LBA7 | 1 | #### |
| LBA8 | 0 | #### |
| LBA9 | 1 | #### |
| LBA10 | 1 | #### |
| LBA11 | 0 | #### |
| LBA12 | 0 | #### |
| ..... | | |

Trim command:
LBA2, LBA4, LBA5, LBA7, LBA9, LBA10, LBA11

FIG. 9

| Physical address | Flush bit | Corresponding logical address |
|---|---|---|
| P0 | 0->1 | LBA0 |
| P1 | 0->1 | LBA1 |
| P2 | 0->1 | LBA2 |
| P3 | 0->1 | LBA3 |
| P4 | 0->1 | LBA4 |
| P5 | 0->1 | LBA5 |
| P6 | 0 | LBA6 |
| P7 | 0->1 | LBA7 |
| P8 | 0 | LBA8 |
| P9 | 0->1 | LBA9 |
| P10 | 0->1 | LBA10 |
| P11 | 0->1 | LBA11 |
| P12 | 0 | LBA12 |
| ... | ... | ... |

| Logical address | Trim/UNC bit | Corresponding physical address |
|---|---|---|
| LBA0 | 0 | B0, P0 |
| LBA1 | 0 | B0, P1 |
| LBA2 | 1 | #### |
| LBA3 | 0 | B0, P3 |
| LBA4 | 1 | #### |
| LBA5 | 1 | #### |
| LBA6 | 0 | B0, P6 |
| LBA7 | 1 | #### |
| LBA8 | 0 | B0, P8 |
| LBA9 | 1 | #### |
| LBA10 | 1 | #### |
| LBA11 | 1 | #### |
| LBA12 | 0 | B0, P12 |
| ... | ... | ... |

METHOD FOR ACCESSING FLASH MEMORY MODULE AND ASSOCIATED FLASH MEMORY CONTROLLER AND ELECTRONIC DEVICE

BACKGROUND OF THE INVENTION

1. Field of the Invention

The present invention relates to a flash memory.

2. Description of the Prior Art

In an electronic device having a flash memory device such as solid-state drive (SSD), if an operating system wants to delete data stored in the flash memory device, the operating system can send a trim command to tell the flash memory device to mark a logical address region corresponding to the data as invalid, and subsequent reads on this logical address region will not return any meaningful data. Specifically, after receiving the trim command, the flash memory device only updates a logical address to physical address mapping table to state that the logical address region corresponding to the data does not correspond to any valid physical address, and the data that becomes invalid is still in the flash memory device internally. That is, only after the flash memory device performs a garbage collection operation, this invalid data is actually erased from the flash memory device.

However, if the logical address region indicated by the trim command corresponds to the data stored in an active block (i.e., the block has empty pages for data writing, or is being written), and a sudden power off recovery (SPOR) occurs after the flash memory device receives and executes the trim command, errors may occur when the flash memory device rebuilds the mapping tables such as the logical address to physical address mapping table, resulting in the situation that the data corresponding to the trim command is recovered.

SUMMARY OF THE INVENTION

It is therefore an objective of the present invention to provide a control method of the flash memory device, which can ensure that the correct mapping table can be reestablished when the trim command is executed and the SPOR occurs, to solve the above-mentioned problems.

According to one embodiment of the present invention, a method for accessing a flash memory module is disclosed, wherein the flash memory module comprises a plurality of blocks, and the method comprises the steps of: writing data into a plurality of pages of a specific block, and establishes or updates a physical address to logical address mapping table (F2H mapping table) based on physical addresses of the plurality of pages and logical addresses of the data; using the F2H mapping table to update a logical address to physical address mapping table (H2F mapping table); initializing a flush-bitmap, wherein the flush-bitmap records a plurality of flush bits corresponding to the physical addresses of the plurality of pages, respectively; and if the flush bit has a first logical value, the corresponding physical address and logical address in the F2H table has not been updated to the H2F mapping table, and if the flush bit has a first logical value, the corresponding physical address and logical address in the F2H table is updated to the H2F mapping table; receiving a trim command from a host device, wherein the trim command asks to mark at least one of the logical addresses of the data as invalid; updating the H2F mapping data to generate an updated H2F mapping table according to the trim command; updating the flush-bitmap to generate an updated flush-bitmap according to the trim command; and writing the updated H2F mapping table and the updated flush-bitmap into the flash memory module.

According to one embodiment of the present invention, a flash memory controller is disclosed, wherein the flash memory controller is configured to access a flash memory module, the flash memory module comprises a plurality of blocks, and the flash memory controller comprises a read only memory and a microprocessor. The microprocessor is configured to execute the program code to control the access of the flash memory module, and the microprocessor is configured to perform the steps of: writing data into a plurality of pages of a specific block, and establishes or updates a F2H mapping table based on physical addresses of the plurality of pages and logical addresses of the data; using the F2H mapping table to update a H2F mapping table; initializing a flush-bitmap, wherein the flush-bitmap records a plurality of flush bits corresponding to the physical addresses of the plurality of pages, respectively; and if the flush bit has a first logical value, the corresponding physical address and logical address in the F2H table has not been updated to the H2F mapping table, and if the flush bit has a first logical value, the corresponding physical address and logical address in the F2H table is updated to the H2F mapping table; receiving a trim command from a host device, wherein the trim command asks to mark at least one of the logical addresses of the data as invalid; updating the H2F mapping data to generate an updated H2F mapping table according to the trim command; updating the flush-bitmap to generate an updated flush-bitmap according to the trim command; and writing the updated H2F mapping table and the updated flush-bitmap into the flash memory module.

According to one embodiment of the present invention, an electronic device comprising a flash memory module and a flash memory controller is disclosed. The flash memory controller is configured to perform the steps of: writing data into a plurality of pages of a specific block, and establishes or updates a F2H mapping table based on physical addresses of the plurality of pages and logical addresses of the data; using the F2H mapping table to update a H2F mapping table; initializing a flush-bitmap, wherein the flush-bitmap records a plurality of flush bits corresponding to the physical addresses of the plurality of pages, respectively; and if the flush bit has a first logical value, the corresponding physical address and logical address in the F2H table has not been updated to the H2F mapping table, and if the flush bit has a first logical value, the corresponding physical address and logical address in the F2H table is updated to the H2F mapping table; receiving a trim command from a host device, wherein the trim command asks to mark at least one of the logical addresses of the data as invalid; updating the H2F mapping data to generate an updated H2F mapping table according to the trim command; updating the flush-bitmap to generate an updated flush-bitmap according to the trim command; and writing the updated H2F mapping table and the updated flush-bitmap into the flash memory module.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating a F2H mapping table according to one embodiment of the present invention.

FIG. 6 is a diagram illustrating flush-bitmaps according to one embodiment of the present invention.

FIG. 8 is a diagram illustrating updating the flush-bitmaps according to one embodiment of the present invention.

FIG. 9 is a diagram illustrating receiving a trim command according to one embodiment of the present invention.

FIG. 12 is a diagram of reestablishing the F2H mapping table according to one embodiment of the present invention.

FIG. 13 is a diagram of using the reestablished F2H mapping table to update the H2F mapping table according to one embodiment of the present invention.

DETAILED DESCRIPTION

Figure 1:
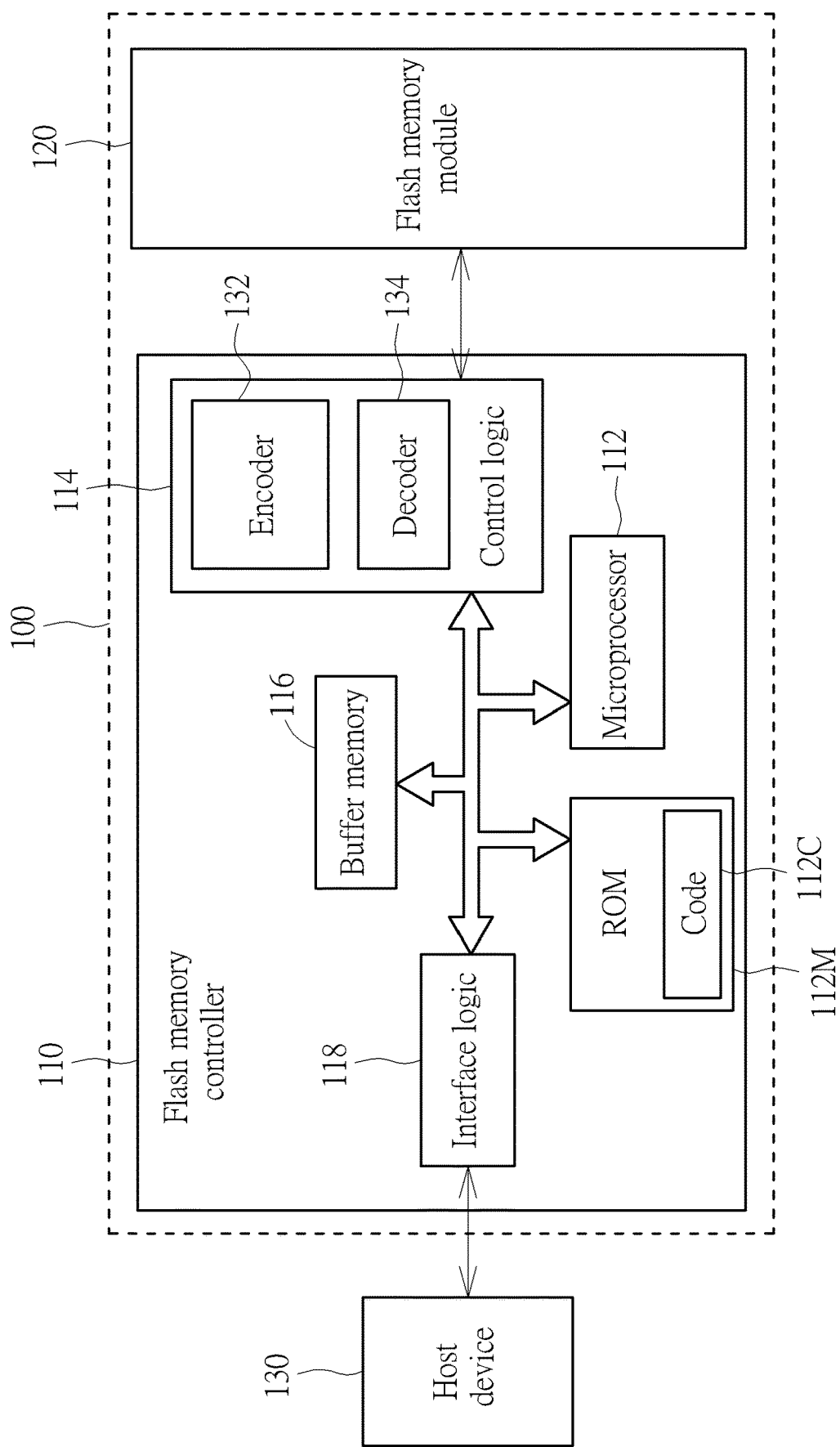
FIG. 1 is a diagram illustrating an electronic device according to an embodiment of the present invention.

FIG. 1 is a diagram illustrating an electronic device 100 according to an embodiment of the present invention. The electronic device 100 includes a flash memory module 120 and a flash memory controller 110. The flash memory controller 110 is configured to access the flash memory module 120. According to the present embodiment, the flash memory controller 110 includes a microprocessor 112, a read only memory (ROM) 112M, a control logic 114, a buffer memory 116 and an interface logic 118. The read only memory 112M is configured to store a code 112C, and the microprocessor 112 is configured to execute the code 112C to control access of the flash memory module 120. The control logic 114 includes an encoder 132 and a decoder 134, wherein the encoder 132 is configured to encode data which is written in the flash memory module 120 to generate a corresponding check code (also known as an error correction code (ECC)), and the decoder 134 is configured to decode data read from the flash memory module 120.

In a general situation, the flash memory module 120 includes a plurality of flash memory chips, and each flash memory chip includes a plurality of blocks. The flash memory controller 110 performs a block-based erase operation upon the flash memory module 120. In addition, a block can record a specific number of pages, wherein the flash memory controller 110 performs a page-based write operation upon the flash memory module 120. In the present embodiment, the flash memory module 120 is a 3D NAND-type flash memory module, but it's not a limitation of the present invention.

Specifically, through the microprocessor 112 executing the code 112C, the flash memory controller 110 may use its own internal components to perform many control operations. For example, the flash memory controller 110 uses the control logic 114 to control access of the flash memory module 120 (especially access of at least one block or at least one page), uses the buffer memory 116 to perform a required buffering operation, and uses the interface logic 118 to communicate with a host device 130. The buffer memory 116 is implemented by a random access memory (RAM). For example, the buffer memory 116 may be a static RAM (SRAM), but the present invention is not limited thereto.

In one embodiment, the electronic device 100 may be a portable memory device such as a memory card which conforms to one of the SD/MMC, CF, MS and XD specifications, and the host device 130 is another electronic device able to be connected to the electronic device 100, such as a cellphone, a laptop, a desktop computer, etc. In another embodiment, the electronic device 100 may be a solid state drive (SSD) or an embedded memory device which conforms to the universal flash storage (UFS) specification or embedded Multi Media Card (EMMC) specification, and can be arranged in a cellphone, a laptop or a desktop computer. At this time, the host device 130 can be a processor of the cellphone, a processor of the laptop or a processor of the desktop computer.

Figure 2:
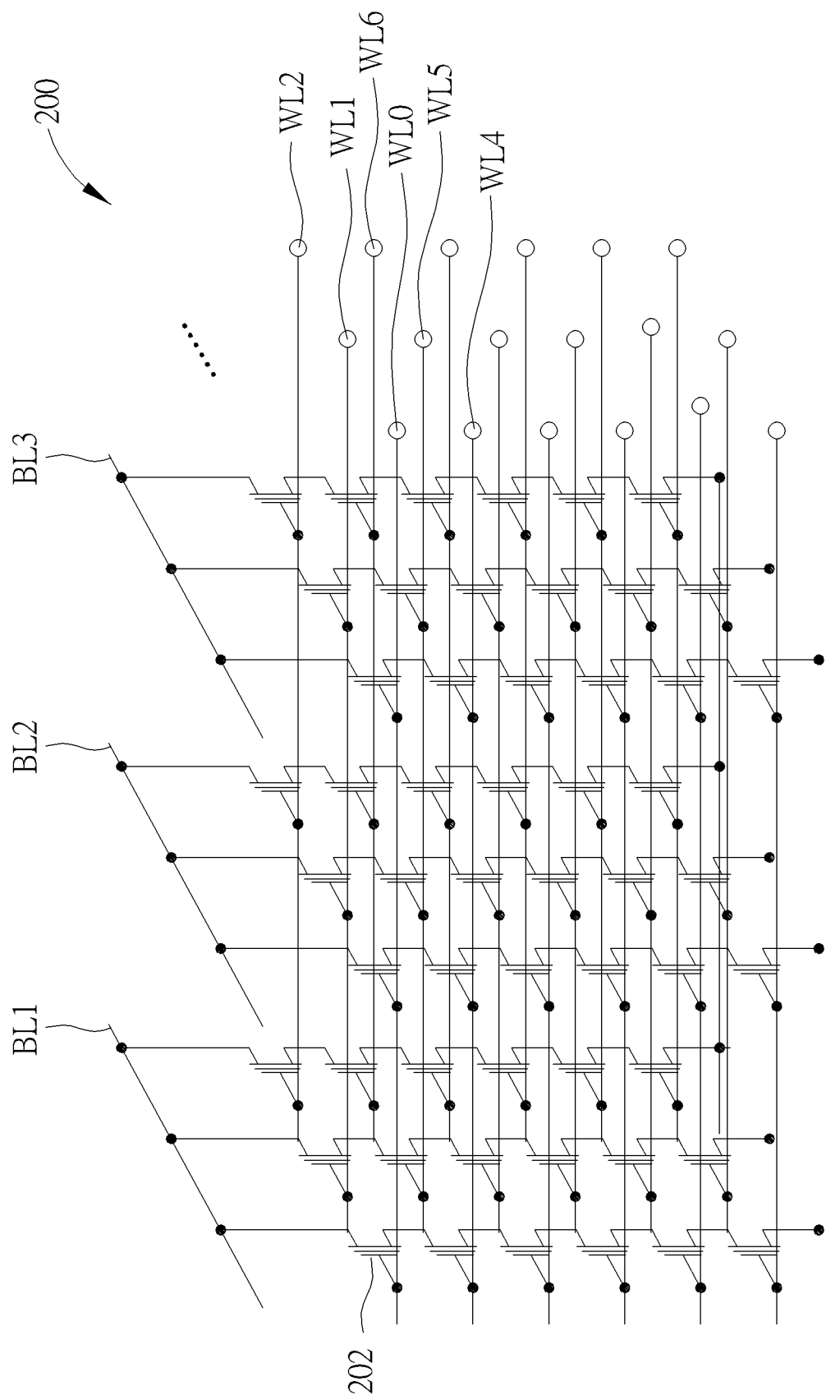
FIG. 2 is a diagram illustrating a block of the flash memory module according to an embodiment of the present invention

FIG. 2 is a diagram illustrating a block 200 of the flash memory module 120 according to an embodiment of the present invention, wherein the flash memory module 120 is a 3D NAND-type flash memory module. As shown in FIG. 2, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2) and a plurality of word lines (e.g., WL0-WL2, WL4-WL6 and following word lines shown in FIG. 2). Taking a top plane in FIG. 2 as an example, all floating gate transistors on the word line WL0 form at least one page, all floating gate transistors on the word line WL1 form at least another one page, and so on. In addition, the definition between the word line WL0 and the page (logic page) may vary depending on a writing method of the flash memory. In detail, when data are stored using a single-level cell (SLC) means, all floating gate transistors on the word line WL0 correspond to only one logic page; when data are stored using a multi-level cell (MLC) means, all floating gate transistors on the word line WL0 correspond to two logic pages; when data are stored using a TLC means, all floating gate transistors on the word line WL0 correspond to three logic pages; and when data are stored using a QLC means, all floating gate transistors on the word line WL0 correspond to four logic pages. The 3D NAND-type flash memory structure and the relationship between word lines and pages are obvious to those skilled in the art. For simplification, no further illustration is provided.

Figure 3:
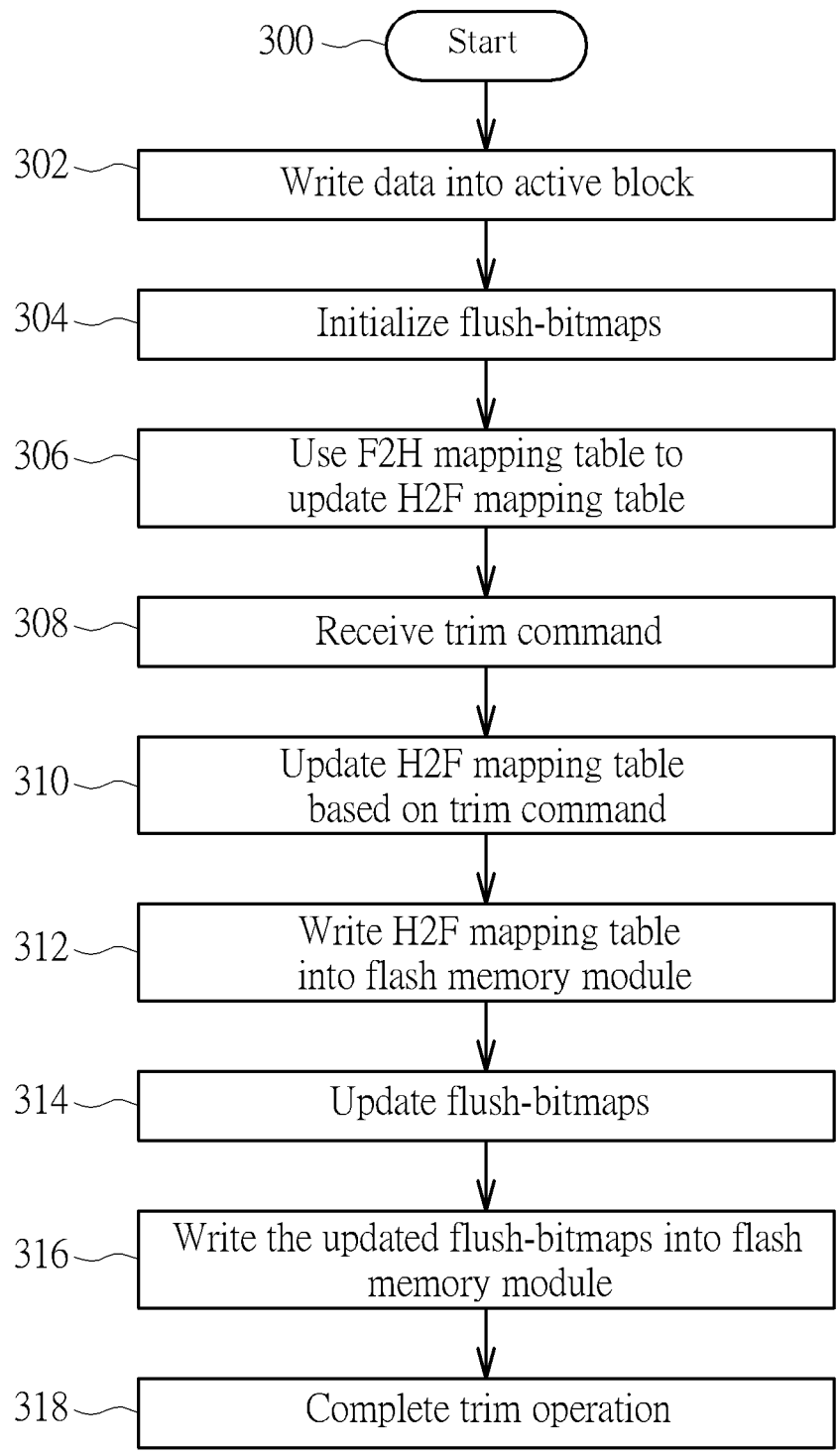
FIG. 3 is a flowchart of a method for accessing the flash memory module according to one embodiment of the present invention.
Figure 4:
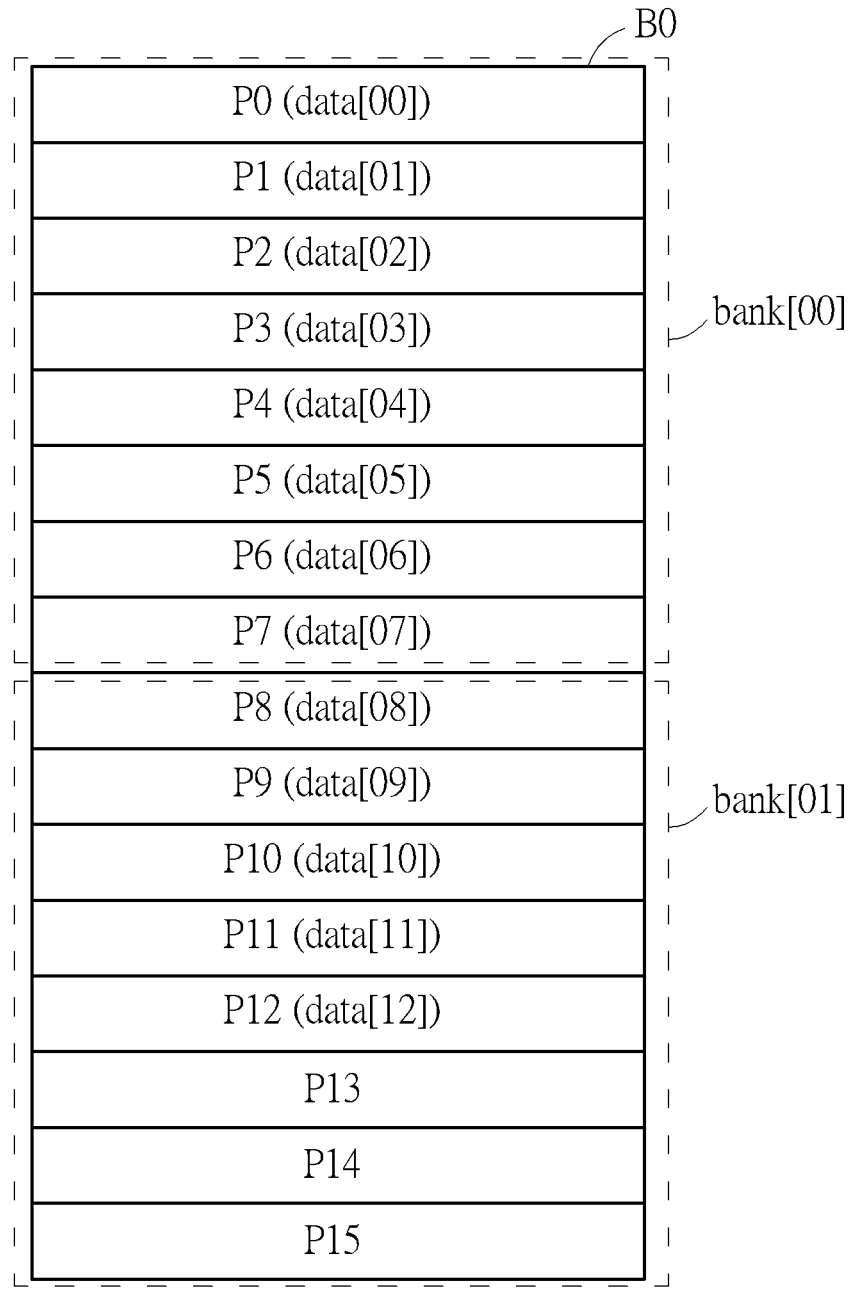
FIG. 4 shows banks within an active block according to one embodiment of the present invention.

FIG. 3 is a flowchart of a method for accessing the flash memory module 120 according to one embodiment of the present invention. In Step 300, the flow starts, and the electronic device 100 is powered on and initialized. In Step 302, the flash memory controller 110 receives a write command from the host device 130, and the microprocessor 112 within the flash memory controller 110 refers to the write command to write data into an active block B0. In this embodiment, referring to FIG. 4, the write command comprises data[00]-data[12], and the microprocessor 112 writes data[00]-data[07] into pages P1-P7 of the active block B0, and writes the data[08]-data[12] into pages P8-P12 of the active block B0. In addition, the active block B0 may be divided into several banks to facilitate memory management, for example, each bank may comprise eight pages (not a limitation of the present invention), that is the pages P1-P7 may belong to a bank[00], and the pages P8-P15 may belong to a bank[01].

In addition, when or after the data is written into the active block B0, the microprocessor 112 establishes a physical address to logical address mapping table (hereinafter, F2H mapping table) 510 for the active block B0 shown in FIG. 5, and the F2H mapping table 510 is temporarily stored in the buffer memory 116, wherein the F2H mapping table 120 has consecutive physical addresses and corresponding flush bits and logical addresses. In this embodiment, assuming that the data[00]-data[12] have the logical addresses LBA0-LBA12, respectively, the F2H mapping table 120 records that the physical address of the pages P0-P12 correspond to the logical addresses LBA0-LBA12, respectively (in FIG. 5, the symbols P0-P12 serve as the physical addresses of the pages for simplicity). In addition, the flush bit indicates that if the data has been written into the active block B0 and a logical address to physical address mapping table (hereinafter, H2F mapping table) is updated according to the data written into the active block B0. At this time, because the H2F mapping table is not updated, the flush bit corresponding to each of the physical address of the pages P0-P12 is "0".

In Step 304, the microprocessor 112 initializes one or more flush-bitmaps for one or more banks. For example, the microprocessor 112 can create the flush-bitmap(s) or load the flush-bitmap(s) from the flash memory module 120. In this embodiment, referring to FIG. 6, the microprocessor 112 can initialize a flush-bitmap 610 for the bank[00] and a flush-bitmap 620 for the bank[01] as shown in FIG. 6, wherein the flush-bitmap 610 comprises the flush bits corresponding to the physical addresses of the pages P0-P7 belonging to the bank[00], and the flush-bitmap 620 comprises the flush bits corresponding to the physical addresses of the pages P8-P15 belonging to the bank[01]. In addition, in this embodiment, each of the flush-bitmaps 610 and 620 comprises information of only part of the F2H mapping table 510, and the flush-bitmaps 610 and 620 does not comprise any logical address recorded in the F2H mapping table 510.

Figure 7:
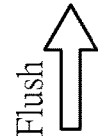
FIG. 7 is a diagram illustrating using the F2H mapping table to update the H2F mapping table according to one embodiment of the present invention.

In Step 306, the microprocessor 112 starts to load a H2F mapping table 710 from the flash memory module 120, and updates the H2F mapping table 710 by using the F2H mapping table 510. Taking FIG. 7 as an example, the microprocessor 112 updates part of the H2F mapping table 710, and the logical addresses LBA0-LBA4 within the H2F mapping table 710 records the corresponding physical addresses (B0, P0)-(B0, P4), and the other logical addresses may be updated later.

In addition, as the physical addresses corresponding to the logical addresses LBA0-LBA4 within the H2F mapping table 710 are updated, the flush-bitmap 610 is also updated so that the flush bits corresponding to the pages P0-P4 become "1", as shown in FIG. 8. In addition, the flush bits of the F2H mapping table 510 are also updated accordingly.

In Step 308, the flash memory controller 110 receives a trim command from the host device, wherein the trim command asks the flash memory controller 110 to mark one or more logical addresses as invalid. In this embodiment, the trim command asks to mark the logical addresses LBA2, LBA4, LBA5, LBA7, LBA9, LBA10 and LBA11 as invalid.

In Step 310, after receiving the trim command, the microprocessor 112 updates the H2F mapping table 710 temporarily stored in the buffer memory 116 according to the logical addresses indicated by the trim command. In this embodiment, referring to FIG. 9, the H2F mapping table 710 comprises a trim bit column or an uncorrectable data error (UNC) column, which indicates that if the corresponding data is invalid or uncorrectable. At this time, the trim bits corresponding to the logical addresses LBA2, LBA4, LBA5, LBA7, LBA9, LBA10 and LBA11 are updated from "0" to "1", that is the data corresponding to the logical addresses LBA2, LBA4, LBA5, LBA7, LBA9, LBA10 and LBA11 becomes invalid.

In Step 312, after the H2F mapping table 710 is updated according to the trim command, the microprocessor 112 writes the updated H2F mapping table 710 into the flash memory module 120.

In Step 314, the microprocessor 112 updates the flush-bitmaps 610 and 620 temporarily stored in the buffer memory 116 according to the logical addresses indicated by the trim command or the updated H2F mapping table 710. Taking FIG. 10 as an example, the flush bits corresponding to the logical addresses indicated by the trim command, such as the logical addresses LBA2, LBA4, LBA5, LBA7, LBA9, LBA10 and LBA11, are updated to be "1", even if the physical addresses corresponding to the logical addresses LBA5, LBA7, LBA9, LBA10 and LBA11 in the H2F mapping table 710 are not updated by using the F2H mapping table 510. In addition, the flush bits of the F2H mapping table 510 are also updated accordingly.

It is noted that the execution order of Step 312 and Step 314 can be reversed, that is the flush-bitmaps 610 and 620 can be updated before the H2F mapping table 710 is written into the flash memory module 120.

In Step 316, after the flush-bitmaps 610 and 620 are updated, the microprocessor 112 writes the updated flush-bitmaps 610 and 620 into the flash memory module 120.

In Step 318, after only after the updated flush-bitmaps 610 and 620 are stored in the flash memory module 120, the flash memory controller 110 will notify the host device 130 that the trim command operation has been successfully completed. In addition, at this time, because F2H mapping table 510 has a large size, in order to avoid the system burden caused by frequent access, the updated F2H mapping table 510 is not stored in the flash memory module 120 after receiving the trim command.

In the embodiment shown in FIG. 3 to FIG. 10, by establishing the flush-bitmaps and storing the flush-bitmaps into the flash memory module 120 before completing the operations of the trim command, it can ensure that the correct mapping table can be reestablished and no data corresponding to the trim command is recovered when the trim command is executed and the SPOR occurs. Specifically, referring to FIG. 11, which is a flowchart of a control method of the flash memory controller 110 according to one embodiment of the present invention, wherein the flow shows the SPOR occurs after Step 318, and the updated F2H mapping table 510 stored in the buffer memory 116 before is missing. In Step 1100, the flow starts, and the electronic device 100 is powered on and initialized for the SPOR. In Step 1102, the microprocessor 112 reestablishes the H2F mapping table. In this embodiment, because the updated H2F mapping table 710 is stored in the flash memory module 120 in Step 312, the microprocessor 112 can directly load the H2F mapping table 710 from the flash memory module 120 to reestablish the H2F mapping table.

Figure 10:
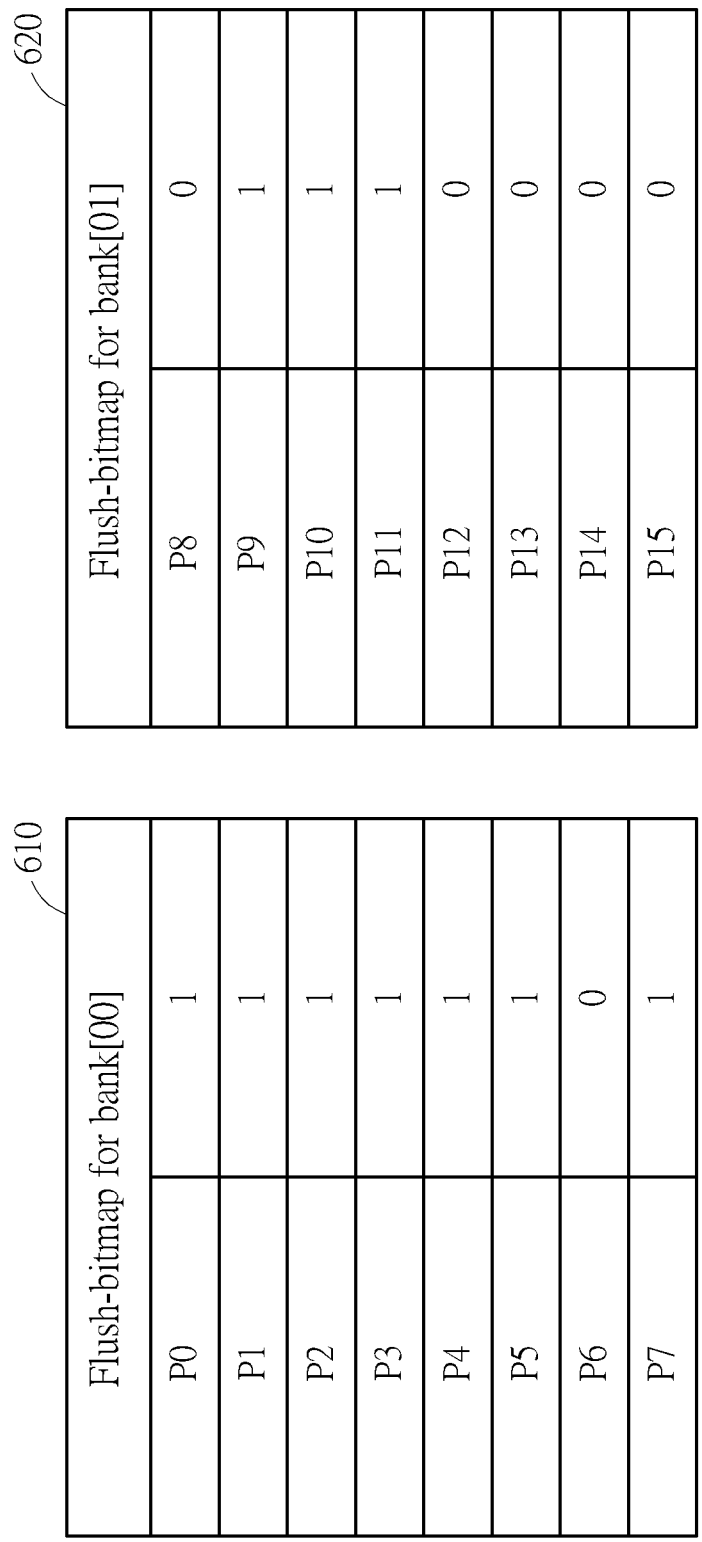
FIG. 10 is a diagram illustrating updating the flush-bitmaps based on the trim command according to one embodiment of the present invention.
Figure 11:
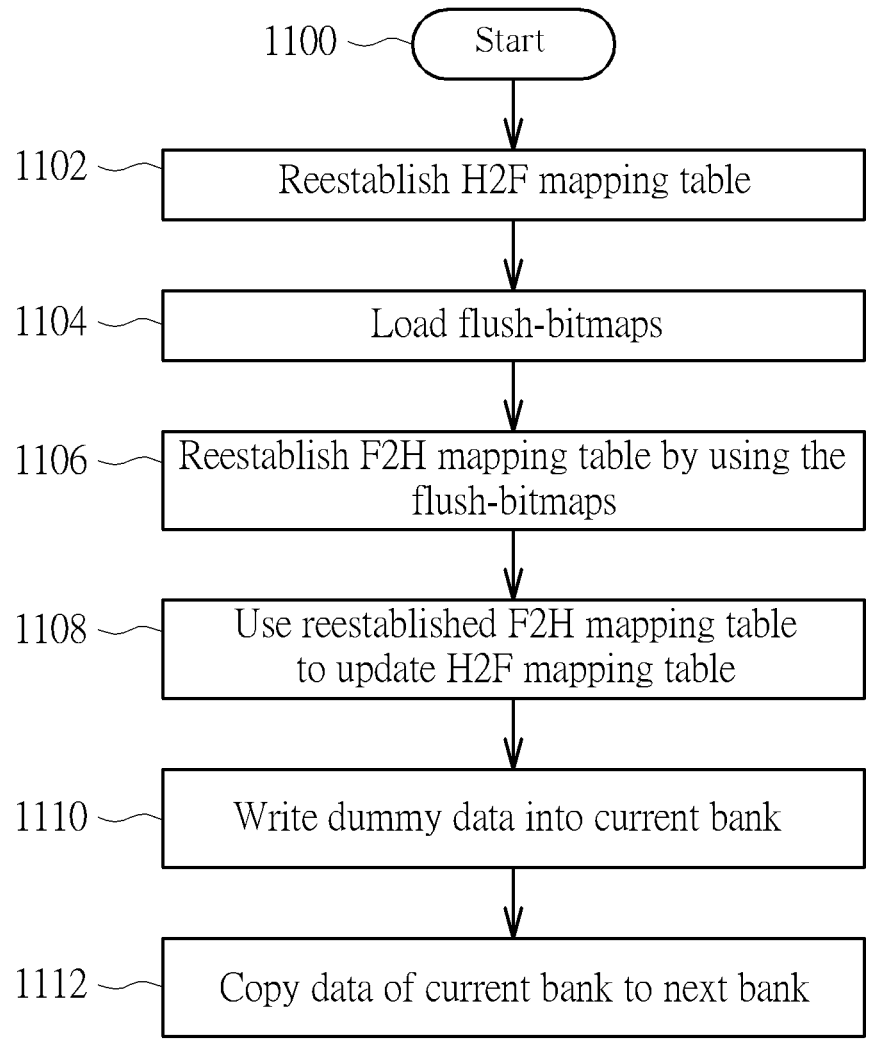
FIG. 11 is a flowchart of a control method of the flash memory controller 110 according to one embodiment of the present invention

In Step 1104, the microprocessor 112 loads the flush-bitmaps 610 and 620 from the flash memory module 120, and stores the flush-bitmaps 610 and 620 into the buffer memory 116, wherein the contents the flush-bitmaps 610 and 620 are shown in FIG. 10.

In Step 1106, the microprocessor 112 reestablishes the F2H mapping table by reading the current bank[01] and the previous bank[00] and using the flush-bitmaps 610 and 620. Specifically, referring to FIG. 12, which is a diagram of a reestablished F2H mapping table 510' according to one embodiment of the present invention. As shown in FIG. 12, because spare regions of the pages P0-P12 of the active block B0 stores the corresponding logical address, the microprocessor 112 can reestablish the information of the logical addresses of the reestablished F2H mapping table 510' by reading the spare regions of the pages P0-P12. However, the microprocessor 112 cannot know if all the information of the pages P0-P12 is updated in the H2F mapping table 710, so initially the flush bits of the reestablished F2H mapping table 510' are set to be "0". Then, the microprocessor 112 uses the flush-bitmaps 610 and 620 to update the reestablished F2H mapping table 510' so that the reestablished F2H mapping table 510' has the latest flush bits.

In Step 1108, the microprocessor 112 updates the H2F mapping table 710 by using the reestablished F2H mapping table 510'. Taking FIG. 13 as an example, the microprocessor 112 updates the H2F mapping table 710 to generate the updated H2F mapping table 710' according to the flush bits in the reestablished F2H mapping table 510'. For example, the corresponding physical address within the H2F mapping table 710 is updated only if the corresponding flush bit is equal to "0". In this embodiment, the logical addresses LBA6, LBA8 and LBA12 within the H2F mapping table 710 records the corresponding physical addresses (B0, P6), (B0, P8) and (B0, P12), respectively.

Figure 14:
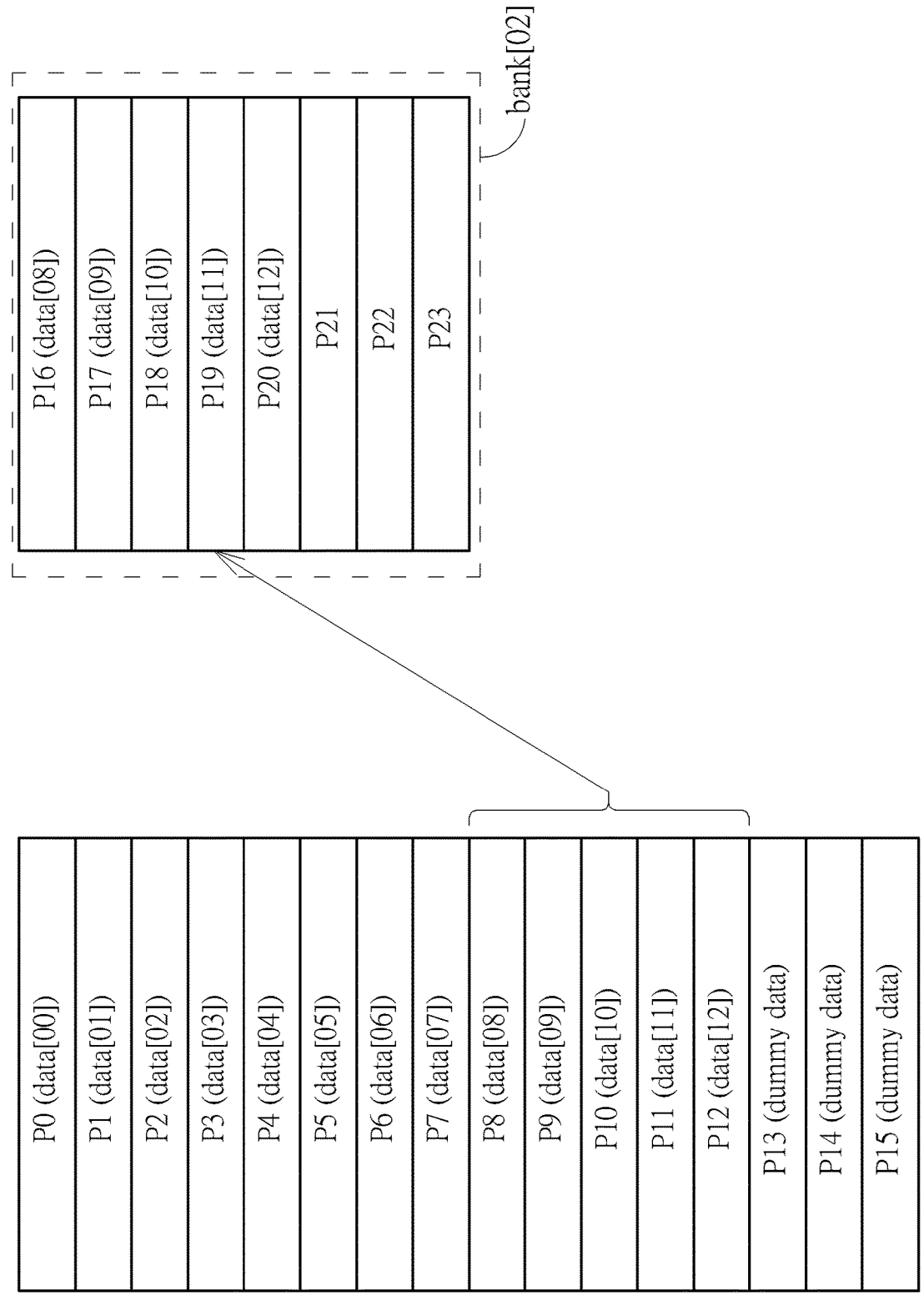
FIG. 14 is a diagram of writing dummy data into current bank and copying data of the current bank into a next bank according to one embodiment of the present invention.

In Step 1110 and Step 1112, because the bank[01] may be unstable due to the sudden power off, the microprocessor 112 may write dummy data into the pages P13-P15 of the bank[02], and the move the data[08] data[12] to a next bank[02], as shown in FIG. 14.

Then, after the data[08]-data[12] are copied to the pages P16-P20, the updated H2F mapping table 710' is further updated so that the logical address LBA8 corresponding to page P16 of the active block B0, and the logical address LBA12 corresponding to page P20 of the active block B0.

In the embodiment shown in FIG. 11 to FIG. 14, for the SPOR issue, by reading the spare region of the active block B0 to reestablish the F2H mapping table, it can make the data already written in the flash memory module 120 does not need to be rewritten again through the host device 130. In addition, by using the flush-bitmap(s) to update the flush bits of the reestablished F2H mapping table, the reestablished F2H mapping table can have the latest flush bits comprising the information of the trim command. Furthermore, by using the reestablished F2H mapping table to update the H2F mapping table, it can make sure that the H2F mapping table has the correct information, and the trimmed data will not be recovered. For example, if the reestablished F2H mapping table is not updated by using the flush-bitmap(s), the reestablished F2H mapping table will not have the correct flush bits, and the logical address LBA2 within the H2F mapping table may be updated by the reestablished F2H mapping table to correspond to the physical address (B0, P2) again, that is the data[02] is recovered in the SPOR issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash memory module, wherein the flash memory module comprises a plurality of blocks, and the method comprises the steps of:
    writing data into a plurality of pages of a specific block, and establishes or updates a physical address to logical address mapping table (F2H mapping table) based on physical addresses of the plurality of pages and logical addresses of the data;
    using the F2H mapping table to update a logical address to physical address mapping table (H2F mapping table);
    initializing a flush-bitmap, wherein the flush-bitmap records a plurality of flush bits corresponding to the physical addresses of the plurality of pages, respectively; and if the flush bit has a first logical value, the corresponding physical address and logical address in the F2H table has not been updated to the H2F mapping table, and if the flush bit has a second logical value, the corresponding physical address and logical address in the F2H table is updated to the H2F mapping table;
    receiving a trim command from a host device, wherein the trim command asks to mark at least one of the logical addresses of the data as invalid;
    updating the H2F mapping data to generate an updated H2F mapping table according to the trim command;
    updating the flush-bitmap to generate an updated flush-bitmap according to the trim command; and
    writing the updated H2F mapping table and the updated flush-bitmap into the flash memory module.

2. The method of claim 1, wherein the step of updating the flush-bitmap to generate the updated flush-bitmap according to the trim command comprises:
    modifying the flush bit(s) whose corresponding physical address corresponding to the at least one of the logical addresses indicated by trim command to have the second logical value.

3. The method of claim 1, wherein the method is performed by a flash memory controller, and the method further comprises:
    only after the updated flush-bitmap is written into the flash memory module, the flash memory controller notifies the host device that the trim command has been successfully completed.

4. The method of claim 1, wherein after the updated H2F mapping table and the updated flush-bitmap are written into the flash memory module, a sudden power off recovery (SPOR) occurs, and the method further comprises:
    reestablishing the H2F table to generate a reestablished H2F table;
    loading the flush-bitmap from the flash memory module; and
    reestablishing the F2H mapping table by reading the plurality of pages of the specific block and using the flush-bitmap, to generate a reestablished F2H table.

5. The method of claim 4, further comprising:
    using the reestablished F2H table to update the reestablished H2F table.

6. A flash memory controller, wherein the flash memory controller is configured to access a flash memory module, the flash memory module comprises a plurality of blocks, and the flash memory controller comprises:
- a read only memory (ROM), arranged to store a program code;
- a microprocessor, configured to execute the program code to control the access of the flash memory module;
- wherein the microprocessor is configured to perform the steps of:
- writing data into a plurality of pages of a specific block, and establishes or updates a physical address to logical address mapping table (F2H mapping table) based on physical addresses of the plurality of pages and logical addresses of the data;
- using the F2H mapping table to update a logical address to physical address mapping table (H2F mapping table);
- initializing a flush-bitmap, wherein the flush-bitmap records a plurality of flush bits corresponding to the physical addresses of the plurality of pages, respectively; and if the flush bit has a first logical value, the corresponding physical address and logical address in the F2H table has not been updated to the H2F mapping table, and if the flush bit has a second logical value, the corresponding physical address and logical address in the F2H table is updated to the H2F mapping table;
- receiving a trim command from a host device, wherein the trim command asks to mark at least one of the logical addresses of the data as invalid;
- updating the H2F mapping data to generate an updated H2F mapping table according to the trim command;
- updating the flush-bitmap to generate an updated flush-bitmap according to the trim command; and
- writing the updated H2F mapping table and the updated flush-bitmap into the flash memory module.

7. The flash memory controller of claim 6, wherein the step of updating the flush-bitmap to generate the updated flush-bitmap according to the trim command comprises:
- modifying the flush bit(s) whose corresponding physical address corresponding to the at least one of the logical addresses indicated by trim command to have the second logical value.

8. The flash memory controller of claim 6, further comprising:
- only after the updated flush-bitmap is written into the flash memory module, the flash memory controller notifies the host device that the trim command has been successfully completed.

9. The flash memory controller of claim 6, wherein after the updated H2F mapping table and the updated flush-bitmap are written into the flash memory module, a sudden power off recovery (SPOR) occurs, and the microprocessor is further configured to perform the steps of:
- reestablishing the H2F table to generate a reestablished H2F table;
- loading the flush-bitmap from the flash memory module; and
- reestablishing the F2H mapping table by reading the plurality of pages of the specific block and using the flush-bitmap, to generate a reestablished F2H table.

10. The flash memory controller of claim 9, further comprising:
- using the reestablished F2H table to update the reestablished H2F table.

11. An electronic device, comprises:
- a flash memory module, the flash memory module comprises a plurality of blocks; and
- a flash memory controller, configured to perform the steps of:
- writing data into a plurality of pages of a specific block, and establishes or updates a physical address to logical address mapping table (F2H mapping table) based on physical addresses of the plurality of pages and logical addresses of the data;
- using the F2H mapping table to update a logical address to physical address mapping table (H2F mapping table);
- initializing a flush-bitmap, wherein the flush-bitmap records a plurality of flush bits corresponding to the physical addresses of the plurality of pages, respectively; and if the flush bit has a first logical value, the corresponding physical address and logical address in the F2H table has not been updated to the H2F mapping table, and if the flush bit has a second logical value, the corresponding physical address and logical address in the F2H table is updated to the H2F mapping table;
- receiving a trim command from a host device, wherein the trim command asks to mark at least one of the logical addresses of the data as invalid;
- updating the H2F mapping data to generate an updated H2F mapping table according to the trim command;
- updating the flush-bitmap to generate an updated flush-bitmap according to the trim command; and
- writing the updated H2F mapping table and the updated flush-bitmap into the flash memory module.

12. The electronic device of claim 11, wherein the step of updating the flush-bitmap to generate the updated flush-bitmap according to the trim command comprises:
- modifying the flush bit(s) whose corresponding physical address corresponding to the at least one of the logical addresses indicated by trim command to have the second logical value.

13. The electronic device of claim 11, further comprising:
- only after the updated flush-bitmap is written into the flash memory module, the flash memory controller notifies the host device that the trim command has been successfully completed.

14. The electronic device of claim 11, wherein after the updated H2F mapping table and the updated flush-bitmap are written into the flash memory module, a sudden power off recovery (SPOR) occurs, and the flash memory controller is further configured to perform the steps of:
- reestablishing the H2F table to generate a reestablished H2F table;
- loading the flush-bitmap from the flash memory module; and
- reestablishing the F2H mapping table by reading the plurality of pages of the specific block and using the flush-bitmap, to generate a reestablished F2H table.

15. The electronic device of claim 14, further comprising:
- using the reestablished F2H table to update the reestablished H2F table.

* * * * *